US009621606B2

(12) United States Patent
Swenson et al.

(10) Patent No.: US 9,621,606 B2
(45) Date of Patent: Apr. 11, 2017

(54) REAL-TIME VIDEO DETECTOR

(71) Applicant: Skyfire Labs, Inc., Mountain View, CA (US)

(72) Inventors: Erik R. Swenson, San Jose, CA (US); Nitin Bhandari, Fremont, CA (US); Jaime Heilpern, San Francisco, CA (US); Robert Oberhofer, Belmont, CA (US); John Hansen, San Jose, CA (US)

(73) Assignee: Opera Software Ireland Limited, Dublin (IE)

( * ) Notice: Subject to any disclaimer, the term of this patent is extended or adjusted under 35 U.S.C. 154(b) by 0 days.

(21) Appl. No.: 13/919,971

(22) Filed: Jun. 17, 2013

(65) Prior Publication Data

US 2013/0282874 A1 Oct. 24, 2013

Related U.S. Application Data

(63) Continuation of application No. 13/448,227, filed on Apr. 16, 2012, now Pat. No. 8,484,358.
(Continued)

(51) Int. Cl.
*H04L 29/06* (2006.01)
*H04L 29/08* (2006.01)
(Continued)

(52) U.S. Cl.
CPC .......... *H04L 65/60* (2013.01); *H04L 65/1076* (2013.01); *H04L 65/80* (2013.01); *H04L 67/2823* (2013.01); *H04L 67/303* (2013.01); *H04N 19/156* (2014.11); *H04N 19/40* (2014.11); *H04N 21/234309* (2013.01); *H04N 21/6379* (2013.01)

(58) Field of Classification Search
CPC . H04L 65/60; H04L 67/2823; H04L 41/5067; H04N 21/63
USPC .................................................. 709/203, 227
See application file for complete search history.

(56) References Cited

U.S. PATENT DOCUMENTS 7,426,546 B2 9/2008 Breiter et al.
7,444,418 B2 10/2008 Chou et al.
(Continued)

FOREIGN PATENT DOCUMENTS

WO WO 2011/038021 A1 3/2011

OTHER PUBLICATIONS

U.S. Appl. No. 61/334,548, filed May 13, 2010, Inventors S. Li et al.
(Continued)

*Primary Examiner* — Asghar Bilgrami
(74) *Attorney, Agent, or Firm* — Fenwick & West LLP

(57) ABSTRACT

A request to retrieve data from a client device is intercepted by a video detector. The video detector determines if the request is for retrieving a video file. If the request is for a video file, and the video file is deemed to be transcoded to be displayed on the client device, the video detector forwards the request to a video optimizer along with encoding parameters. Encoding parameters are selected by the video detector based on properties of the client device, networks accessible by the client device, conditions of those networks, properties of the requested video and the type of video requested. The encoding parameters also include a file format type to which the requested video is to be transcoded.

20 Claims, 8 Drawing Sheets

Related U.S. Application Data

(60) Provisional application No. 61/476,214, filed on Apr. 15, 2011.

(51) Int. Cl.
    *H04N 21/6379*     (2011.01)
    *H04N 21/2343*     (2011.01)
    *H04N 19/156*     (2014.01)
    *H04N 19/40*     (2014.01)

(56) References Cited

U.S. PATENT DOCUMENTS

| | | |
|---|---|---|
| 7,567,575 B2 | 7/2009 | Chen et al. |
| 8,161,519 B2 * | 4/2012 | Krause .............. H04L 29/06027 725/138 |
| 2003/0061305 A1 * | 3/2003 | Copley .............. H04L 29/06027 709/217 |
| 2004/0024900 A1 | 2/2004 | Breiter et al. |
| 2004/0148393 A1 | 7/2004 | Breiter et al. |
| 2007/0076714 A1 | 4/2007 | Ananthakrishnan et al. |
| 2009/0049189 A1 | 2/2009 | Zhu et al. |
| 2009/0204719 A1 * | 8/2009 | Simongini .............. H04W 4/02 709/231 |
| 2009/0254672 A1 | 10/2009 | Zhang |
| 2010/0070608 A1 | 3/2010 | Hosur |
| 2010/0281042 A1 | 11/2010 | Windes et al. |
| 2011/0055047 A1 | 3/2011 | Fox |
| 2011/0066673 A1 | 3/2011 | Outlaw |
| 2011/0265134 A1 | 10/2011 | Jaggi et al. |
| 2011/0280216 A1 * | 11/2011 | Li .......................... H04L 12/14 370/331 |

OTHER PUBLICATIONS

European Extended Search Report, European Application No. 12771178.6, Nov. 6, 2014, 10 pages.

European Extended Search Report, European Application No. 12770968.1, Nov. 6, 2014, 9 pages.

Fletcher T R: "Efficient Ablation of an Organic Polymer by a Laser Driven Shock Wave". Journal of Applied Physics, American Institute of Physics US, vol. 73, No. 10, May 15, 1993 (May 15, 1993), pp. 5292-5294.

Korean Office Action, Korean Application No. 10-2013-7030089, Feb. 5, 2014, 4 pages (with concise explanation of relevance).

U.S. Appl. No. 61/334,625.

* cited by examiner

REAL-TIME VIDEO DETECTOR

CROSS-REFERENCE TO RELATED APPLICATIONS

This application is a continuation of U.S. application Ser. No. 13/448,227, filed Apr. 16, 2012, which claims a benefit of, and priority to, U.S. Provisional Application No. 61/476,214 filed Apr. 15, 2011, both of which are incorporated by reference herein in their entirety.

BACKGROUND

1. Field of Art

The disclosure generally relates to the field of encoding videos, and more specifically to encoding videos in substantially real time as the video is streamed to a computing device.

2. Description of the Related Art

Users of computing devices commonly view videos on their computing devices. Conventionally, users download video files on their computing device and execute the file to view the video. These conventional methods of viewing content are disadvantageous because they require a user to wait for a file to download before the user can view the file. Moreover, it may be unreasonable to expect a user to download each file, locate it on the computing device and execute it.

To overcome these shortcomings, some systems enable users to stream video files from a hosting server. However, applications executing on a client device may not be enabled to stream certain formats of video streams. Additionally, the video frames within the video stream may be too large to provide a uninterrupted playback to a mobile computing device with limited computing resources or a poor network connection. This is particularly true with mobile computing devices having poor network connections. As such, users of mobile computing devices typically have to wait to stream videos on their devices. The videos that are streamed typically freeze or buffer periodically, preventing a user from enjoying uninterrupted playback of a video stream.

Some servers may encode video streams to deliver a lower resolution video to a mobile computing device. However, such systems also cause a lag between a user's request and the streaming process. For example, such systems are unable to transcode a video stream in real-time while streaming the transcoded video to the user. Additionally, such systems are typically unable to preserve video control functionality for users, such as pause, seek, and video resolution changes. As such, users who wish to stream video files on their mobile computing devices typically have to wait an unreasonable amount of time for a video to load and buffer or they have to suffer through a video that does not provide an uninterrupted playback.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Disclosed is a system, a method and computer readable medium for detecting a video request. It comprises intercepting a request to retrieve a video from a server, wherein the request originates from a client device and is intercepted from a network. Additionally, the request is analyzed to determine if the request is for retrieving a video based on information associated with the request. If the request is for a video, a profile is selected for the video based on the properties of the video. Additionally, the request is analyzed to determine whether to transcode the video for playback on a client device based, wherein the determination is made based on values provided in the video profile. If the video is marked for transcoding, the video is redirected to an optimizer along with transcoding parameters. The transcoding parameters are selected based on the selected video profile and network connection properties. The optimized video is sent to a client device requesting the video to enable playback therein.

System Architecture

Figure 1:
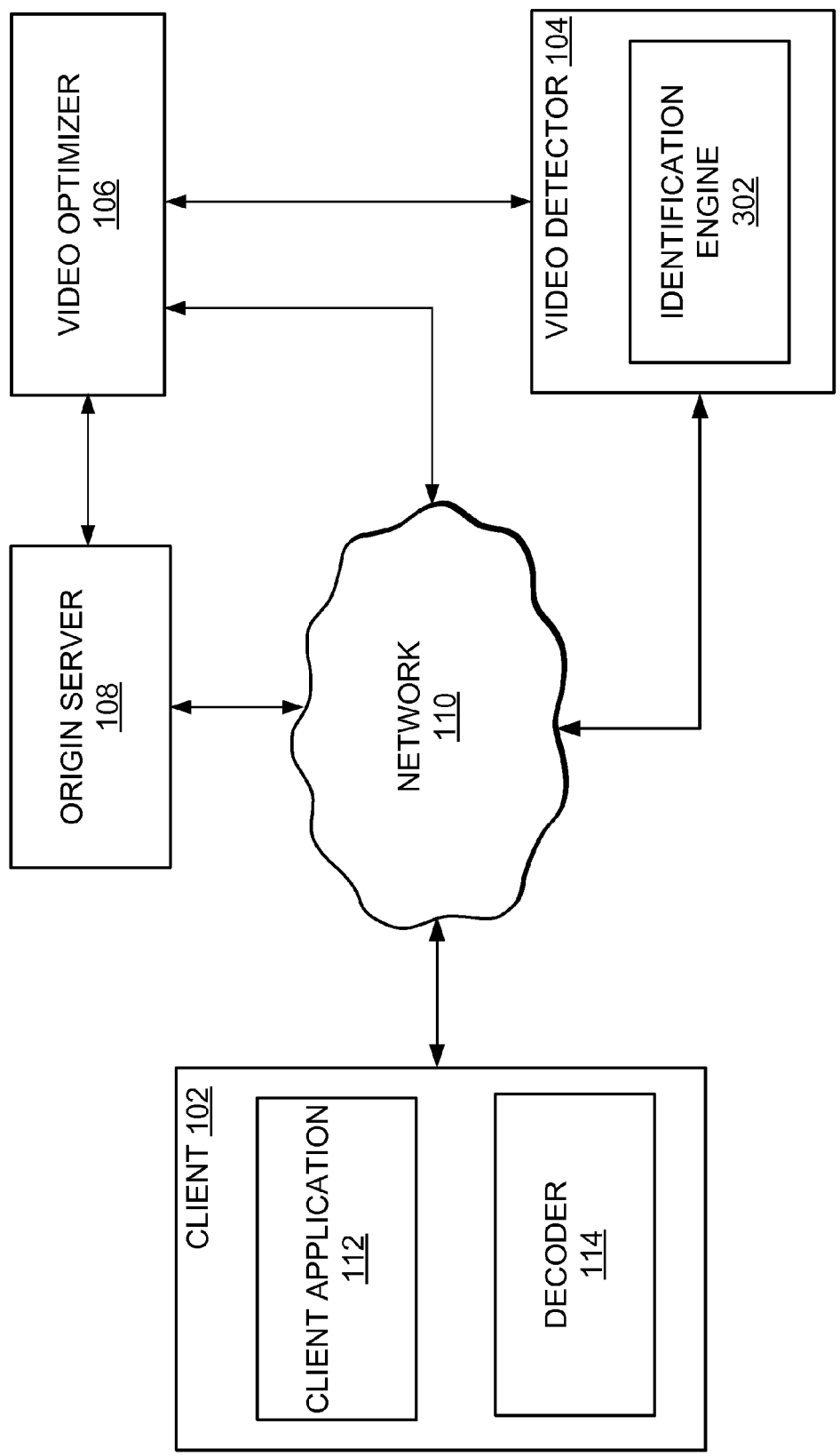
FIG. 1 is a high-level block diagram of a computing environment according to one embodiment.

FIG. 1 is a high-level block diagram of a computing environment, according to one embodiment. It includes a client computing device 102 that includes a client application 112 and a decoder 114, a video detector 104, a video optimizer 106, an origin server 108, and a network 110 connecting the client computing device 102, the detector 104 and the origin server 108. In one embodiment, the video optimizer is connected to the video detector 104 and the origin server 108 via the network.

At a high-level, responsive to a user request, a client application 112 executing on the client computing device 102 requests to retrieve content over the network 110. The video detector 104 intercepts the request and determines if the request is for a video. If the request is not for a video, the video detector 104 forwards the request to an appropriate hosting server. If on the other hand, the request is for a video, the video detector 104 flags the video for transcoding and redirects the flagged request back to the client computing device 102. The client computing device 102 sends the flagged request over the network 110, wherein the request is routed to the video optimizer 106. The video optimizer 106 requests the video from the origin server 108 and optimizes the video received from the origin server computing device 108. The optimized video is sent to the video detector 104, wherein it is forwarded back to the client computing device 102 over the network 110. A decoder 114 executing on the client computing device 102 may decode the received video stream to playback the stream for a user viewing the client computing device 102.

The network 110 represents the communication pathways between the client computing device 102, the video detector 104 and the origin server 108. Although not illustrated in FIG. 1, the video optimizer may also be connected to the video detector 104 and the origin server 108 via the network 110. The network 110 can also utilize dedicated or private communications links that are not necessarily part of the Internet. In one embodiment, the network 110 uses standard communications technologies and/or protocols. Thus, the network 110 can include links using technologies such as Ethernet, Wi-Fi (802.11), integrated services digital network (ISDN), digital subscriber line (DSL), asynchronous transfer mode (ATM), etc. Similarly, the networking protocols used on the network 110 can include multiprotocol label switching (MPLS), the transmission control protocol/Internet protocol (TCP/IP), the hypertext transport protocol (HTTP), the simple mail transfer protocol (SMTP), the file transfer protocol (FTP), etc. In one embodiment, at least some of the links use mobile networking technologies, including general packet radio service (GPRS), enhanced data GSM environment (EDGE), code division multiple access 2000 (CDMA 2000), and/or wide-band CDMA (WCDMA). The data exchanged over the network 110 can be represented using technologies and/or formats including the hypertext markup language (HTML), the extensible markup language (XML), the wireless access protocol (WAP), the short message service (SMS) etc. In addition, all or some of links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

The client computing device 102 represents any entity operated by a user that receives video streams over a network 110. The client computing device 102 is sometimes referred to as a "mobile device" or a "display device." In one embodiment, the client computing device 102 includes a computer system utilized by an end-user to communicate with other computers on the network 110 in order to stream a video file. In other embodiments, the client computing device 102 includes a network-capable device other than a computer system, such as a personal digital assistant (PDA), a cellular telephone, a smartphone, a pager, a television "set-top box" etc. Although FIG. 1 illustrates only one client computing device 102, embodiments of the present invention can have thousands or millions of client devices connected to the network 110. A client application 112 may be executing on the client computing device 102. A client application may include any application capable of executing on a client device and interfacing with the network 112. Examples of client applications include, but are not limited to web browsers such as SKYFIRE, FIREFOX, INTERNET EXPLORER, CHROME, etc. The client application 112 may interface with a user and receive users requests to playback a video stream. In response to the user request, the client application 112 sends a request to stream a video over the network 110. The video may be encoded on a video optimizer, as described in the specification before being streamed to the client computing device 102. In one embodiment, a decoder 114 decodes an incoming encoded video stream and provides it to the client application 112. The client application 112 may playback the decoded video stream on a display associated with the client computing device 102. In another instance, the encoded video received from the video optimizer 106 may be stored at the client 102 for a later viewing. The encoded video may also be stored at the client 102 in an embodiment wherein the client is a cache or a similar device as known in the art.

A video detector 104 intercepts requests made by the client computing device 102. In one embodiment, the video detector 104 is an inline network appliance connected to the client computing device 102 via the network 110. In another embodiment, the video detector 104 may execute on the client computing device 102. As an inline network appliance, the video detector 104 receives all, or a subset of all the traffic sent and received by the client computing device 102, including Hypertext Transfer Protocol (HTTP), Real Time Messaging Protocol (RTMP) traffic. In such an embodiment, the video detector serves as a network proxy. In one embodiment, the video detector 104 is highly available (HA) and scalable in order to handle many gigabits of traffic per second. In such an embodiment, the video detector 104 consists of a network proxy process, such as SQUID with the video detector 104 called by SQUID over a local network interface such as Internet Content Adaptation Protocol (ICAP). In one embodiment, the video detector 104 handles RTMP traffic by using another process integrated into the video detector 104. In one embodiment, another appliance may be a network proxy that calls the video detector 104 via an application programming interface (API). Such an embodiment allows the video detector 104 to integrate with an existing network infrastructure. As such, the video detector 104 may integrate with load balancers, routers, and content steering appliances.

In one embodiment, the video detector 104 is implemented on a client computing device 102. As such, a client or a software provider is enabled to have a video optimization service without requiring network components. The video detector 104 may execute as a proxy running on the device to intercept HTTP (and other) protocols to feed through a video detection process. In such an embodiment, requests and/or responses may be redirected to the video transcoder 106 or file cache directly from the client computing device 102. In one embodiment, client software may call into a service to determine whether to enable optimization or not, enabling optimization to be a service that is available to users.

The video optimizer 106 transcodes a video identified by the video detector 104. The video optimizer 106 communicates with the video detector 104 and the origin server computing device 108 via the network 110. The video optimizer receives a request to optimize a video from a client computing device 102 and routed by the video detector 104. The video optimizer 106 may call the origin server computing device 108 to retrieve a requested video and transcodes it. The transcoded video may be streamed to the client computing device 102 via the video detector 104. In one embodiment, the video optimizer 106 interfaces with the client computing device 102 over the network 110. The origin server computing device 108 is an entity that provides webpages, audio/video files and/or other electronic documents to a client computing device 102. The web origin server computing device 108 can be, for example, a major Internet web site operated by a national media outlet, a personal blog on a web server operated by a lone individual, and/or another distributor of web pages. While only one web hosting servers 108 is shown in FIG. 1, embodiments of the system can have thousands or millions of different hosting servers. Only one origin server computing device 108 is shown for purposes of clarity. This description uses the term "video" to refer to any electronic file, e.g., document, audio, or video file, and the like, served by a origin server computing device 108, regardless of whether the document is technically a video file.

Example Computing Machine Architecture

Figure 2:
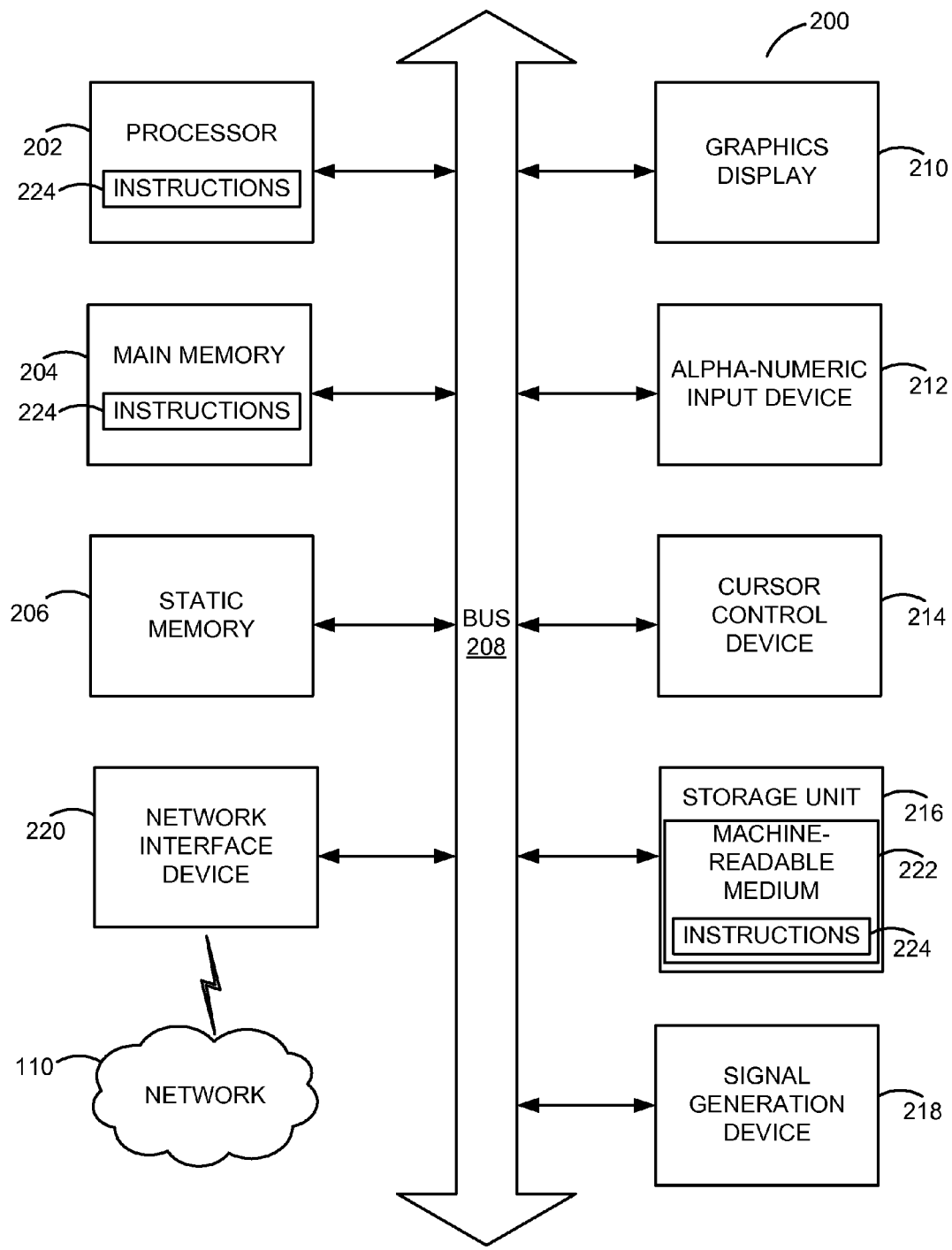
FIG. 2 is a high-level block diagram illustrating a functional view of a typical computer system for use as one of the entities illustrated in the environment of FIG. 1 according to one embodiment.

FIG. 2 is a high-level block diagram illustrating one embodiment of a typical computing machine. It is noted that the computing machine 200 may be a system or part of a system, e.g., two or more machines operating together or one or more machines operating with one or more other devices. The computing entities illustrated in the environment of FIG. 1 (e.g., 102, 104, 106 and 108) are structured similarly to the computing machine 200 and can be further customized for particular functional configurations (e.g., operations) as described further herein.

FIG. 2 illustrates components of an example machine able to read instructions from a machine-readable medium and execute them in one or more processors and/or controllers. Specifically, FIG. 2 shows a diagrammatic representation of a machine in the example form of a computer system 200 within which instructions 224 (e.g., software code) for causing the machine (e.g., having the one or more processors and/or controllers) to perform anyone or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 224 (sequential or otherwise) that specify actions to be taken by that machine. Further, while only a single machine is illustrated, the term "machine" shall also be taken to include any collection of machines that individually or jointly execute instructions 224 to perform anyone or more of the methodologies discussed herein.

The example computer machine 200 includes a processor 202 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 204, and a static memory 206, which are configured to communicate with each other via a bus 108. The computer system 200 may further include graphics display unit 210 (e.g., a plasma display panel (PDP), a liquid crystal display (LCD), a projector, or a cathode ray tube (CRT)). The computer system 200 may also include alphanumeric input device 212 (e.g., a keyboard), a cursor control device 214 (e.g., a mouse, a trackball, a joystick, a motion sensor, or other pointing instrument), a storage unit 216, a signal generation device 218 (e.g., a speaker), and a network interface device 220, which also are configured to communicate via the bus 208.

The storage unit 216 includes a machine-readable medium 222 on which is stored instructions 224 (e.g., software) embodying any one or more of the methodologies or functions described herein. The instructions 224 (e.g., software) may also reside, completely or at least partially, within the main memory 204 or within the processor 202 (e.g., within a processor's cache memory) during execution thereof by the computer system 200, the main memory 204 and the processor 202 also constituting machine-readable media. The instructions 224 (e.g., software) may be transmitted or received over the network 110 via the network interface device 220.

While machine-readable medium 222 is shown in an example embodiment to be a single medium, the term "machine-readable medium" should be taken to include a single medium or multiple media (e.g., a centralized or distributed database, or associated caches and servers) able to store instructions (e.g., instructions 224). The term "machine-readable medium" shall also be taken to include any medium that is capable of storing instructions (e.g., instructions 224) for execution by the machine and that cause the machine to perform any one or more of the methodologies disclosed herein. The term "machine-readable medium" includes, but not be limited to, data repositories in the form of solid-state memories, optical media, and magnetic media.

Configuration for Encoding Data

Figure 3:
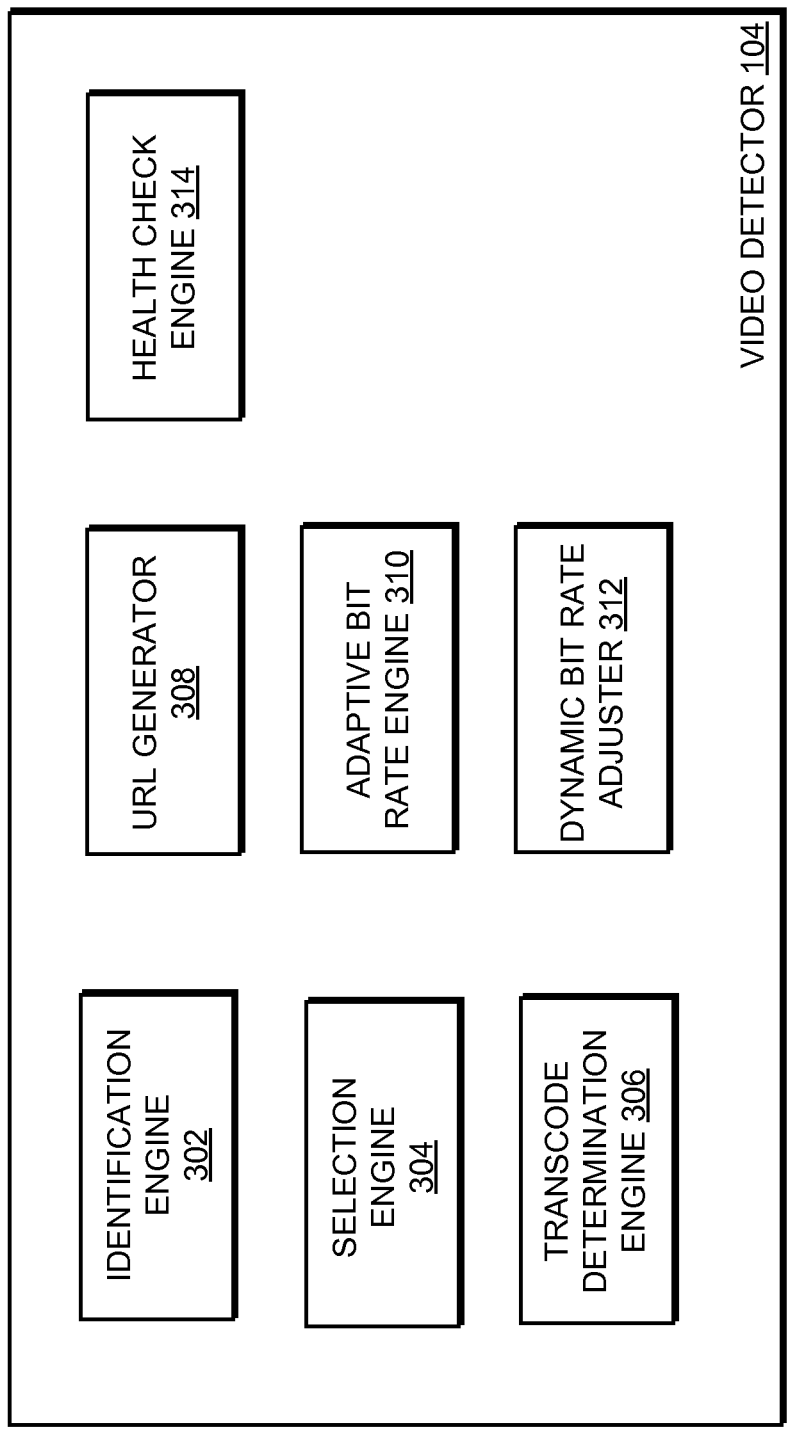
FIG. 3 illustrates one embodiment of a high level block diagram of a video detector for encoding video files.

Referring now to FIG. 3, it illustrates an embodiment of a video detector 104, in accordance with an embodiment. As noted previously, the video detector 104 is structurally configured similarly to the computing machine 200 and further configured as noted herein. The video detector 104 is illustrated as a high-level block diagram of modules configured to detect a request to stream video files and to route video request to the video optimizer 106 if appropriate. In one embodiment, the video detector 104 includes an identification engine 302, a selection engine 304, a transcode determination engine 306, a URL generator 308, an adaptive bit rate engine 310, a dynamic bit rate adjuster 312 and a health check engine 314. The modules are configured to function and interoperate as described herein.

The identification engine 302 determines if a request is generated by a client computing device 102 or a response to the client computing device 102 is a video stream. In one embodiment, the identification engine 302 looks at filename extensions or other known URL schemes (for example, a YOUTUBE video fetch) to determine if a video feed is requested. In a response path, the identification engine 302 looks at mime type or other header information and/or the actual payload data to determine if a request is for video feed. For example, FLASH video (FLV) and MPEG-4 (MP4) videos are identifiable by looking at 4 or 8 bytes of the payload respectively. FLV files start with 'F', 'L', 'V' and MP4 videos have 'f', 't', 'y', 'p' in bytes 5 through 8. In one embodiment, the selection engine 304 identifies a user agent and a referrer header to determine the type of video request. If the referrer header is, for example, http://<something>.swf, the identification engine 302 assumes it was requested by a FLASH player. Some browsers do not insert the referrer header for plug-ins, so the identification engine may look for the absence of this header to identify a video request. As such, the identification engine 302 determines if a fetch request is for a video stream. In one embodiment, the identification engine 302 adds a video redirect to optimizer flag to client requests for videos.

In one embodiment, although a file or a request may be for a video, the identification engine 302 does not identify the request as a video is the request is tagged with a do not transcode flag. For example, if a video detector cannot process a video or file, the video optimizer 106 may add such a flag so that the video detector 104 does not send the same video back to the video optimizer 106.

The selection engine 304 selects encoding profiles for each identified video fetch request. The coding profiles may be based on several parameters associated with the requesting client computing device 102, including but not limited to, a user-agent, player version, user/subscription information including the user's data plan, etc., network type (WiFi, third generation mobile telecommunications protocol (3G), fourth generation mobile telecommunications protocol (4G), etc., current network state and network congestion. The selected profile comprises of at least one of a flag enabling or disabling transcode or video compression, a video width/height, a video bit rate, a video frame rate divisor, an audio sample rate and number of channels, an audio bit rate and other encoding information, such as CODEC and CODEC profile, such as H.264 main, etc., and a video container destination, such as FLV, MP4, etc. In one embodiment, the selected profile information is provided to the transcode determination engine 306 which determines whether to transcode a video file.

In one embodiment, the selection engine 304 selects an encoding profile to optimize playback at the client. The video optimizer 106 may be capable of changing a container format of a video in a transcoding process. For example, a FLASH player may playback a variety of encoded videos, so an MP4 may be converted to an FLV without causing an error. Since FLV files do not specify in advance all the frame sizes, it beneficially permits adaptive transcoding. In addition, since a video optimizer 106 can transcode to format that is beneficial to a client situation, the selection engine 304 may select an encoding profile to take advantage of hardware accelerated decoding and other client properties.

The transcode determination engine 306 determines whether to transcode a video associated with a fetch request and determines bit rates for the video optimizer 106. In one embodiment, the transcode determination engine 306 makes such a determination based on an encoding profile provided by the selection engine 304. For example, video compression may be enabled or disabled for a particular user based on rate plan, etc., as provided in an encoding profile. In one embodiment, the transcode determination engine 306 uses this information to along with current network condition information to determine whether to transcode a video. Through communication with a congestion detection element in the network, individual flows can be adapted to varying degrees based on congestion.

In one embodiment, once a profile is selected by the selection engine 304, the transcode determination engine 306 estimates a source bit rate. For example, profile parameters such as duration may be used along with the size of the file to calculate the source bit rate. The estimated bit rate received from the selection engine 304 is compared to the source bit rate, wherein if the estimated compression gain is not sufficient, or negative, the video is marked to be ignored by the video optimizer 106 and is passed on to the client. In one embodiment, the profile selection engine 304 is configured for minimum compression gain.

In another embodiment, if dimensions of the source video are less than dimensions of a profile, the transcode determination engine 306 can use the difference between the areas to compute a smaller bit rate to account for the smaller video dimension. Because a video optimizer 106 does not make dimensions of a video larger, transcode determination engine 306 reduces the bit rates accordingly. In one embodiment, the reduction is calculated using the ratio of square root of the areas.

The URL generator 308 generates a URL with a domain/host providing a redirect request to the video optimizer 106 if the video is deemed to be transcoded by the transcode determination engine 306. In one embodiment, the URL may contain at least one of a video width/height, a video bit rate, a video frame rate divisor, an audio sample rate and number of channels, an audio bit rate, a source URL, a user agent of a client, a source domain cookie and any other authentication data by the video optimizer 106. In one embodiment, the URL generator rewrites the original response with an HTTP redirect and sets the location header to the new URL. This causes the client to issue a new request to the video optimizer 106. The video detector 104 also has logic to look for incoming URLs with URLs generated by a video detector so that they are not intercepted again.

The adaptive bit rate engine 310 regulates bitranges available to a client. In one embodiment, the adaptive bit rate engine limits bit rates to force a player to adapt to certain bit rate ranges instead of consuming as much bandwidth as possible. Adaptive bit rate (ABR) players 310 measure network throughput in order to decide which bit rate profile to use. The adaptive bit rate engine 310 may employ rate limiting to force the player to think that the network is congested or slower speed than reality. In one embodiment, the bit rate engine 130 applies rate limiting for the requested video segments to the limit specified by the profile selection. Similarly, the adaptive bit rate engine 310 uses user profiles for files in a progressive download. The adaptive bit rate engine may also work in conjunction with another network element that performs the rate limiting. In such an instance, the ABR engine notifies the network element with a target bit rate to use in a rate limiter.

In another embodiment, the adaptive bit rate engine performs manifest file manipulation to limit the available bit rates that are advertised to the client. For substantially real-time transcoding, the adaptive bit rate engine 310 creates manifest file profiles for bit rate ranges that did not exist previously. For ABR protocol a manifest file advertises to the client computing device 102 the available bit rates a server has available. Through interception and rewriting the manifest file, the adaptive bit rate engine 310 can eliminate certain bandwidth profiles, and thus leaving the client 'blind' to the existence of these profiles. As such the client computing device 102 switches to the new advertised profiles, enabling the adaptive bit rate engine 310 to regulate the video bit rate. If an ABR session does not contain bit rates that are acceptable for a given network/user state, the adaptive bit rate engine intercepts the manifest file and inserts the additional bit rate profiles and/or deletes higher bit rate profiles based on the user profile selected. In one embodiment, the video detector sends information to the video optimizer 106, or it may wait until a non-existent bit rate segment is requested. The video optimizer 106 can fetch the higher bit rate segment(s) from the origin server and begin transcoding into the new bit rate. The video optimizer 106 then forwards the segment to the video detector 104 which then forwards it on to the client computing device 102.

The dynamic bit rate adjuster 312 changes encoding bit rate mid-stream. For FLV file format, for instance, since frame sizes are not indicated in advance, the dynamic bit rate adjuster 312 may change the encoding size or a bit rate mid-stream. As conditions change in the network 110, the dynamic bit rate adjuster 312 updates the video optimizer 106 to the new conditions. To facilitate this operation, the dynamic bit rate adjuster 312 assigns a session ID to each video flow. In one embodiment, a load balancer may control transcoders. In such a system, the update requests can be sent to an appropriate transcoder because the load balancer can steer traffic to a particular transcoder based on this session ID.

Alternatively, the dynamic bit rate adjuster 312 can send broadcast messages to the video optimizer 106. If the broadcast message contains individual flows or session IDs, the transcoders within the video optimizer can still act on a per-flow basis. If not, the bit rate adjustment is global across all flows. The bit rate adjustment message can take two forms. The first form is a direct encoder adjustment. In this form, the dynamic bit rate adjuster 312 sends a new bit rate (and possible width, height, etc.) to the transcoder. The transcoder on a video optimizer 106 follows these instructions with some possible exception handling. The second form is an indirect adjustment. In this form, the dynamic bit rate adjuster 312 communicates a congestion level, or encoding aggressiveness. The transcoder interprets this information and identifies compression settings responsive to the level sent by the dynamic bit rate adjuster 312.

The health check module 314 queries the video optimizer 106 periodically to identify transcoding capacity. Knowledge of transcoding capacity may help prevent a case where there are insufficient resources for further transcoding or an outage. If there is a period of inactivity, the health check module 314 periodically queries the video optimizer 106 to make sure resources are available when needed. A video detector 104 executing on a client computing device 102, may monitor the transcoder response when redirecting a session and re-redirect back to the original URL on a failure or the health check module 314 may perform a health check before doing the redirect.

Figure 4:
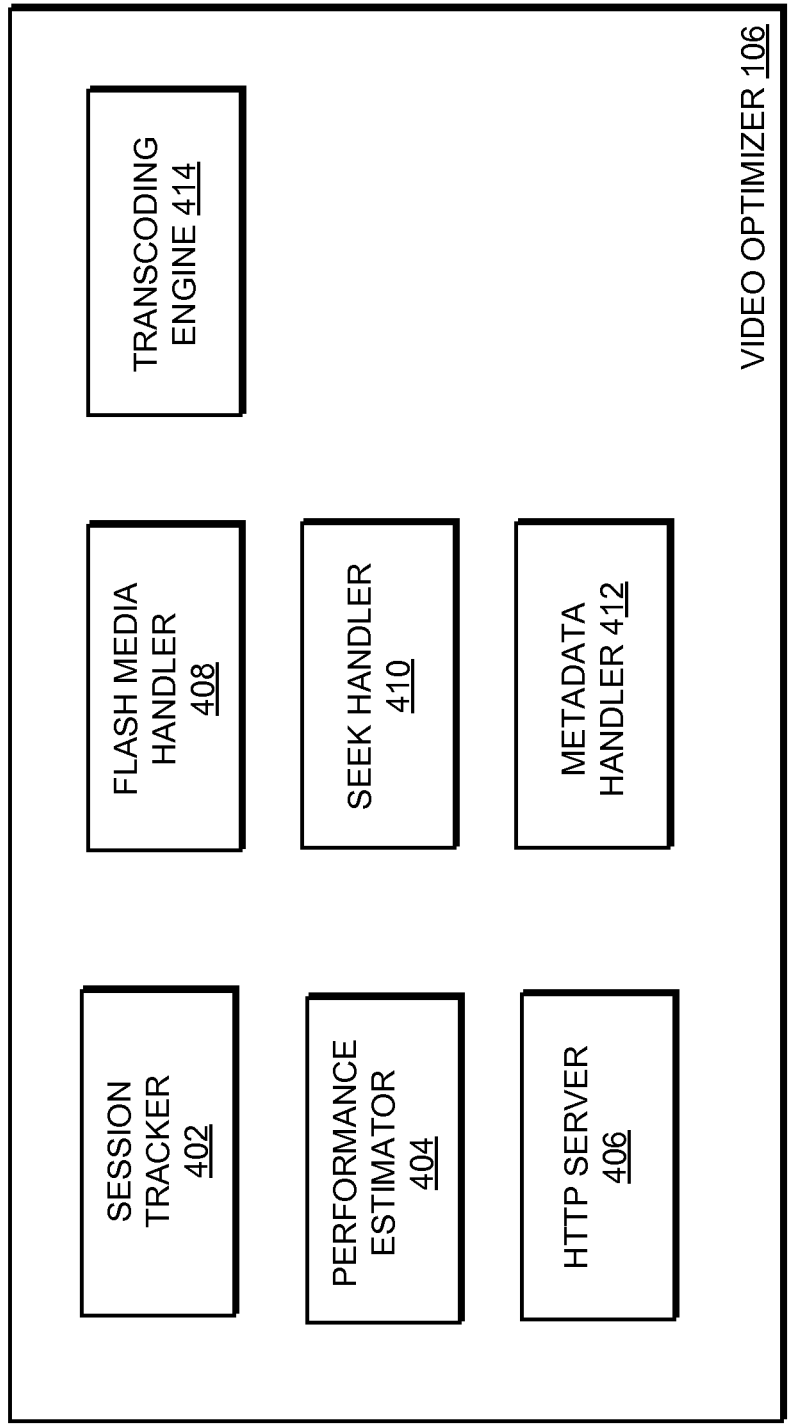
FIG. 4 illustrates one embodiment of a high level block diagram of a video optimizer for encoding video files.

FIG. 4 illustrates an embodiment of a video optimizer 106, in accordance with an embodiment. As noted previously, the video optimizer 106 is structurally configured similarly to the computing machine 200 and further configured as noted herein. The video optimizer 106 is illustrated as a high-level block diagram of modules configured to encode a video received from a origin server computing device 108 and responsive to a client computing device 102 request. In one embodiment, the video optimizer 106 comprises a session tracker 402, a performance estimator 404, a HTTP server 406, a FLASH HTTP handler 408, a seek handler 410, a metadata handler 412 and a transcoding engine 414. The modules are configured to function and interoperate as described herein.

The session tracker 402 tracks all sessions executing on the video optimizer 106 by using session IDs and/or URL provided by the video detector 104. The session tracker 402 may keep track of sessions for dynamic adjustments and for seek operations. In one embodiment, if the system wants to address flow-specific bandwidth, the session tracker 402 may provide an appropriate instance of a transcoder. In another embodiment, the session tracker 402 tracks sessions to keep track of requests associated with a seek request. For example, when a seek operation, such as fast-forward occurs, the client application 112 on the client computing device 102 aborts a file download requests and starts a new download with a new starting point.

In one embodiment, the video detector 104 assigns a unique ID to each session directed to the video optimizer 106. The sessions may also be stored based on their associated URLs. In another embodiment, a sessions's URL and/or flow identification such as the IP 4/5-tuple of src/dest IP and src/dest Port and protocol may be used to track each session.

In one embodiment, each new session sent to the transcoder has its session ID or URL stored in a table in the session tracker 402. The session ID may remain stored in the table as long as the transcoder 414 is still generating data to the user. If the connection drops (when they player does a seek, or for some other reason), the session is placed in a standby state where it is kept for a period of time to see if a new request for the same session comes in. After the timer expires, the session is removed from the session table.

In one embodiment, the session tracker 402 also keeps track of statistics for the transcoder 414. Each running instance in the server (HTTP, transcoder, etc.) registers itself with the session tracker 402 when a new connection begins processing. The session tracker 402 assigns an ID (not the same as session ID) for each connection. Since there are multiple request types that can be processed by the video optimizer 106, each unique type is stored in separate state tables or be combined into one large table. A running session can call back into the session tracker 402 to update its statistics on a periodic basis. The session tracker 402 makes this data available through a web interface and/or a Simple Network Management Protocol (SNMP) etc. The session tracker 402 also accumulates long-term statistics based on the statistics updates from each instance. These statistics take the form of real-time (active sessions) and long-term sessions which use completed sessions. These statistics also track minimum, maximum and average statistics for each statistic. When a process completes, it de-registers itself with the session tracker 402, which can then reclaim the resources associated with that session.

The performance estimator 404 oversees the video optimizer 106 to determine if it is nearing maximum capacity. Because a combination of source and destination CODECs in addition to the source video's complexity are potentially different for every stream, the performance estimator 404 cannot look at total connections as an indicator of "busyness". It is also not sufficient to look at Central Processing Unit (CPU) utilization as CPU utilization can spike to 100% for various reasons during the transcoding process despite the transcoder still have room to handle more sessions. Capping the server to a value less than one hundred percent consequently leaves capacity on the table.

The performance estimator 404 interfaces with a load-balancer to allow individual servers to take themselves out of the load-balancing pool when they deem they are near capacity. This will leave current sessions (and resumed sessions due to seek) uninturrepted, but new connections will not be sent to the server until some capacity frees up. In one embodiment, a load-balancer queries the server periodically to get its status. The server can return one of the following results: hold-off mode, indicating that the server has reached capacity, and new sessions should be sent there. Existing sessions continue to be sent to the server and processed. Shutdown mode indicates that a server is in the process of shutting down, and no new sessions should be sent to it. This can be due to an internal server error, or a forced (graceful) shutdown. During a graceful shutdown existing sessions continue to be sent to the server and processed until they are all completed at which point the actual shutdown can proceed. No hold-off mode or shutdown mode may indicate that the system is running properly, and can accept new connections. If the server does not respond, or responds with an error, the load-balancer assumes it is down, and removes it from the pool. No new or existing sessions will be sent to the server.

In one embodiment, an applied algorithm is used by the performance estimator 404 to estimate performance of a server. The algorithm can be embodied as instructions storable on a computer readable storage medium (e.g., a memory or disk) and executed by one or more processors (or controllers). In one embodiment, the performance estimator 404 assumes that a given processor core can handle a certain amount of macroblocks (or pixels) per second. Thus one can empirically measure how many macroblocks per second can be decoded. The performance estimator 404 then measures how many macroblocks can be encoded per second. As a new session starts up, the performance estimator 404 looks at a file to be decoded, and an output configuration. By looking at the video dimensions and frame rates, the performance estimator can get an estimate of how many macroblocks per second of decode and encode are needed. The (first order) equation to calculate utilization proceeds as follows:

$$decodeMacroBlackCapacity = decodeCapacityPerCore \times numberOfCores$$

$$encodeMacroBlockCapacity = encodeCapacityPerCore \times numberOfCores$$

$$srcMB = \sum_{all\ active\ source\ videos} imageWidth + 16 + imageHeight + 16$$

$$destMB = \sum_{all\ active\ destination\ videos} imageWidth + 16 + imageHeight + 16$$

$$serverUtilization =$$
$$100\% \times \left( \frac{srcMB}{decodeMarcoBlockCapacity} + \frac{destMB}{encodeMacroBlockCapacity} \right)$$

As such, the performance estimator calculates a reasonable first-order approximation of the server's current utilization. Additional factors can also be employed to take into account CODEC type. Some CODECs may be computationally simpler than others. Additionally, there may be other non-linear effects such as resource starvation that may affect utilization rates. The server may have memory bandwidth or other hardware limitations that may prevent it from reaching full capacity. These can simply be added as factors to the equation provided above.

In one embodiment, the performance estimator 404 considers processor hyper-threading (HT). HT allows one processor core to act as multiple virtual cores. The HT cores are not full cores however, and they share resources. This can cause problems with higher resolution video. For instance, some Intel XEON processors cannot perform two 1080P decode operations on two HT cores that share the same physical core. Performance drops off dramatically if this is attempted. To handle this, 1080P videos are allowed to use even numbered cores to decode. This means that a total number of 1080P sessions are half the number of processor cores.

In one embodiment, after the performance estimator 404 calculates a server's utilization, it compares the utilization to a threshold value to see if a hold-off flag should be asserted. This threshold is in percent, and can be above 100% if desired. It is noted that in one embodiment if server can run at higher than 100% capacity, the transcode operations may not keep up with real-time.

In one embodiment, the HTTP server 406 identifies a request type and associates an appropriate media handler to handle the transaction. Most transcoding sessions come to the video optimizer 106 as HTTP sessions. In one embodiment, RTMP sessions are handled as FLV progressive download. Other network interfaces may be used if needed. In one embodiment, the HTTP server parses incoming requests to extract the settings passed from the video detector 104 including bit rates, resolution, etc. The incoming request may also contain the original requested URL and cookies, or the RTMP connect message payload.

Once the HTTP server 406 has determined the request type, it associates a media handler to handle the transaction. A media handler is responsible for handling most of the network protocol-specific communication. The output of the media handler is binary data in the form requested by the video detector 104, including FLASH FLV for example. The HTTP server 406 packages this data into a proper HTTP response.

One complication of FLASH video is that the FLASH player does not accept chunk encoded data. This means that either Content-Length encoding is used, or connection close. Connection close allows an encoder to skip specifying the content length in advance, which is typically unknown since transcoding is performed in real-time. The consequence of this is that the FLASH player typically does not allow seek operations. Alternatively, a guess may be provided. This value can be larger than the actual value, and most browsers handle this properly if a connection is closed when a transfer is finished.

The HTTP server 406 makes an educated guess for the content length based on the source file. As an estimate, the HTTP server 406 may use the original content length. The HTTP server also looks at the source bit rate compared to a bit rate target. The ratio of these two can be used as a starting point for the output content length. The HTTP server may pad the frames the ensure the target is not exceeded. If the source file is in MP4 format, the HTTP server 406 gets an estimate by using an MP4 algorithm described below.

The FLASH media handler 408 handles FLASH HTTP progressive download. In one embodiment, the FLASH media handler 408 fetches a source file from a origin server computing device 108 using information provided by the video detector 104. For example, the FLASH media handler 408 receives URL, user-agent and cookies information from the video detector 104 and passes the information to the transcoding engine 414. In one embodiment, as the transcoding engine 414 transcodes the source file, the FLASH media handler 408 reads the transcoded output data and encapsulates the output data into a FLV or a MP4 container. In other embodiments, the transcoding engine 414 encapsulates the transcoded output data. In addition, the FLASH media handler 408 is also enable to resume transcoding sessions that are stopped because of a seek operation is executed by a user on a client computing device 102.

The seek handler 410 handles seeks operations executed by a user on a client computing device 102 in one of three ways described herein. It is noted that when a user executes a seek operation, a current transcode operation is suspended and a new file download and transcode operation is initiated. In a first embodiment, the seek handler 410 downloads a new file associated with the seek operation. The download operation includes metadata headers including CODEC headers, duration, etc. In such an instance, the new file is sent to the transcode engine 414 to be transcoded without any knowledge of the previous session.

In a second embodiment, a new file download operation may only have partial header information, but does not have other metadata which the transcoding engine 414 can use to identify the source file's properties. In such an instance, a start time or a seek time of a video is determined by identifying a time stamp of the video. The seek handler 410 retrieves metadata from the previously suspended transcode operation and provides metadata and time stamp data to the transcoding engine 414 to initiate a transcoding process at a time associated with the time stamp. In a third embodiment, a new file download is a range-offset. The range-offset may be a raw offset into the source file. In such an instance, metadata headers are unavailable, however frame headers may be included if available. In such an embodiment, the suspended session's metadata is reused and provided to the transcoding engine 414 to transcode the new file. In embodiments wherein a previous or suspended session's metadata is used, the seek handler 410 performs a session transfer by making a copy of the suspended session's metadata and passing it to the new session's handler. In one embodiment, the metadata is created as file output is formed by a media encapsulator such as the FLASH media handler 408. In such an instance, FLV or MP4 headers are created at the start of the file and frame headers needed during the file transcode process.

The metadata handler 412 provides metadata associated with a video to the transcoding engine 414. For FLV videos, at least one of the following metadata fields are passed to the transcoding engine 414: a sourcedata meta tag used by GOOGLE video, for example, to track a source of the video file; a canseekontime meta tag instructing a FLASH player that seek on time operations can be performed; an aktimeoffset parameter used to indicate a starttime of the video; keyframe meta tags providing seek points of the video to a FLASH player, in one embodiment, the source frame's keyframes are passed to the transcoding engine and not the transcoded file's key frames because the FLASH payer uses this data to send seek requests to the original server based on the original file's properties; cuepoints meta tags which also provide seek points to a player; haskeyframe and canseektoend meta tags. In addition, the metadata handler 412 generates metadata fields if the source file does not have them. For example, the metadata handler 412 may create starttime and duration fields for videos to be transcoded.

In an embodiment wherein MP4 source files are to be transcoded, the metadata handler 412 converts MP4 metadata fields to FLV metadata fields if the MP4 source file needs to be re-containerized. In an embodiment where MP4 is the output format, the MP4 metadata fields are preserved in the output file by the metadata handler 412. Below is a list of metadata fields. The first entry in NamePairs is an MP4 name, a second entry is an FLV name, and the third is the scaling factor:

```
NamePairs pairs[ ] =
{
    // YouTube
    { "gsst", "starttime", 0.001 },
    { "gstd", "totalduration", 0.001 },
    // Dailymotion
    { "coff", "starttime", 1.0 },
    { "pdur", "duration", 1.0 },
    { NULL, NULL }
};
```

In one embodiment, the transcoding engine 414 transcodes input videos based on parameters provided by the video detector and the metadata provided by the appropriate media handler. In one embodiment, a transcode rate may be predetermined as provided by a video detector 104 or by a media handler. If however, the predetermined rate is less than a transcoding rate possible, the transcoding engine 414 uses the frame rate of the output video to modulate the transcoding rate. In such an instance, the transcoder 414 transcodes at a nominal frame rate of the video during a transcoding session. For example, if an output file is 15 frames per second (fps), the transcoder may not run any faster than 15 fps. In one instance, the transcoding engine 414 may transcode at a faster rate to prevent stalls in the client's media player.

In one embodiment, the transcoder 414 operates in a 'turbo mode,' by using a fast start mechanism in conjunction with transcoding at a nominal frame rate of the video during a transcoding session. For example, when a new session starts, or a seek operation is executed, the transcoding engine 414 transcodes a video at a fast rate for a number of frames to prime the network and the player's receive buffer. In one embodiment, transcoding engine 414 transcodes at a high rate for the first 150 frames of a video.

In one embodiment of a transcoding engine 414 uses third party libraries for transcoding. In such instances, the transcoding engine 414 runs a transcoding operation in a separate process from the primary server process because the third party libraries may not be stable. Thus, if a transcoding operation causes a crash, or memory corruption, the damage is limited to that session and other users and the server itself are not affected. In order to accomplish this, the video optimizer 106 creates a shared memory object to pass data between the video optimizer 106 and the transcoding engine 414. The source file is written to the transcoding engine 414 through the shared memory. This can either be the raw data, or the video optimizer 106 can write to disk and then tell the transcoding engine 414 about the current state through the shared memory. Data created by the transcoding engine 414 is written to the shared memory by the transcoding engine. The video optimizer 106 then reads this data and sends it over the network to the client computing device 102.

In one embodiment, the transcoding engine 414 transcodes a video file at an adaptive rate. As described in the specification, the transcoding engine 414 starts transcoding using a profile. As the transcoding runs, the transcoding engine 414 can alter the audio and/or video bit rate based on network conditions. There may be a device in the network that can signal congestion or target bit rates to the transcoder, or the transcoding engine 414 may make the decisions on its own. In either case, the transcoding engine 414 can change its encoding settings in real-time based on this feedback. For example, every few seconds, the transcoding engine 414 picks a new target bit rate and future frames can be encoded with the new values.

In order to monitor the network for adaptive transcoding, the transcoding engine 414 determines if a network 110 stack is filling up when sending data to a client over a network. If the network is filling up, the bit rates can be lowered. An example of a network check is to see if network write requests are backing up. If the video optimizer 106 uses TCP, the TCP send buffers will fill up, and additional network sends will have to be postponed until there is room in the buffers. In one embodiment, the transcoding engine 414 uses this property to increase the bit rates delivered to a client computing device 102. For example, if the network does not appear congested, the bit rates can be gradually increased while checking for backup. In one embodiment, the transcoding engine 414 uses turbo mode described above, before or in conjunction with a bit rate increase to generate several frames quickly. If those frames make it through the network without issues, the bit rate may be increased.

In one embodiment, the network conditions may be determined by sending an unaltered video stream to a device on a network. For example, a video detector 104 or another device on the network 110 may request the video optimizer 106 to forward an unaltered video stream. In such an instance, the transcoding engine 414 can monitor network throughput without transcoding to identify any network congestion. In one embodiment, the transcoding engine 414 samples the network throughput to determine network congestion or capacity. In one embodiment, the video detector 104 may sample the unaltered video throughput to determine network conditions.

Example Process for Transcoding Videos

Figure 5:
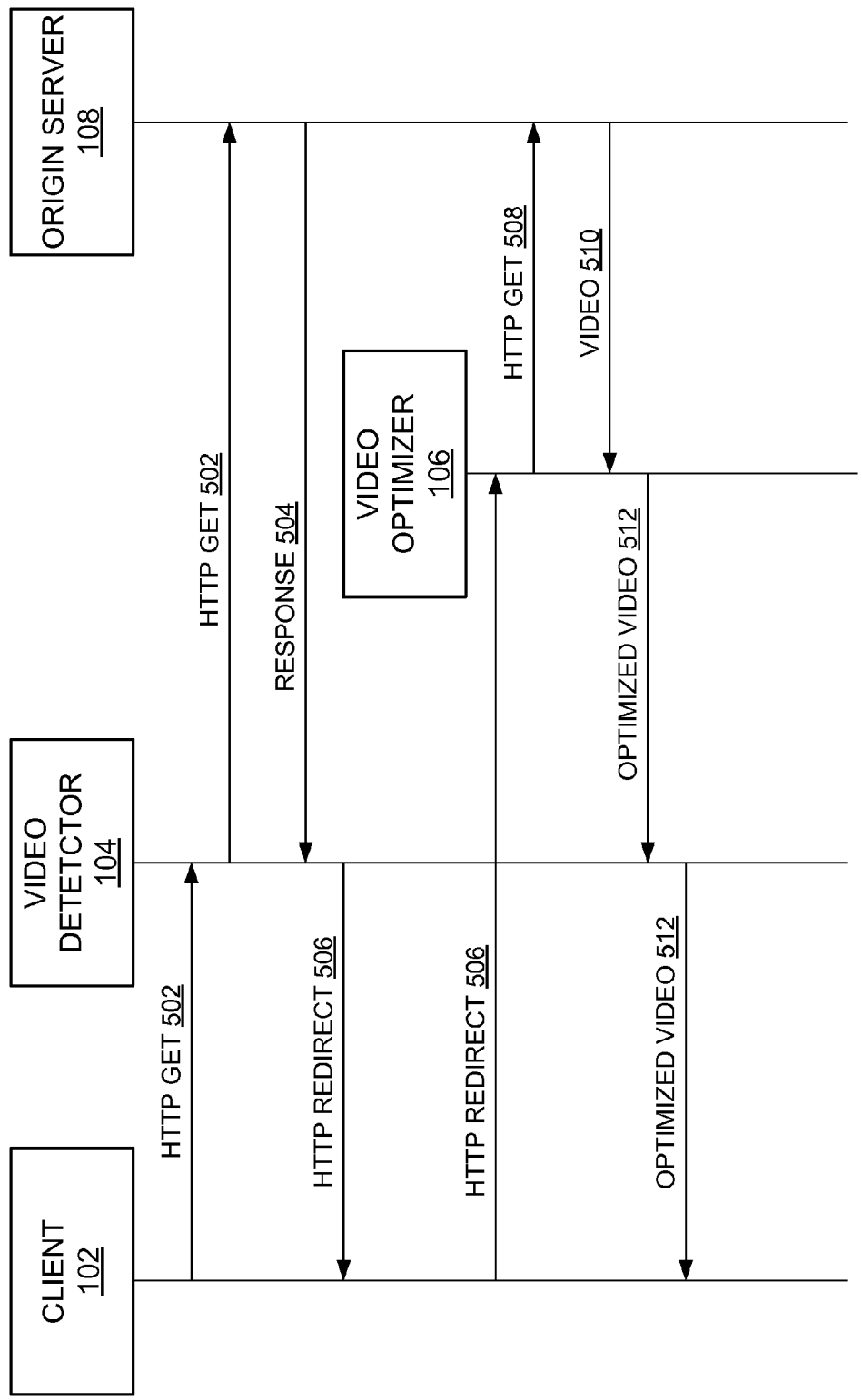
FIG. 5 is an interaction diagram illustrating a process flow between a various elements in a computing environment, in accordance with an embodiment.

FIG. 5 is an interaction diagram illustrating a process flow between a client computing device 102, a video detector 104, a video optimizer 106 and a origin server computing device 108. In one embodiment, the client computing device 102 initiates an HTTP get request 502 to retrieve content from an origin server computing device 108. The video detector 104 intercepts all requests generated by a client computing device 102. In one embodiment, the video detector 104 identifies if the HTTP get request is a video. In another embodiment, the video detector forwards the HTTP get request 502 to an intended origin server computing device 108 and receives a response 504 from the origin server. The video detector 104 parses the response 504 to determine if the response 504 is a video. If the response 504 is a video, the video detector 104 re-writes the response 504 to be a HTTP redirect response 506, causing the client 102 to request the file from the video optimizer 106. In one embodiment, the video detector sends the HTTP redirect request 506 to the client computing device 102. If the response is not a video, or the video detector 104 determines that the request should not be transcoded, the video detector 104 forwards the response to the client computing device 102.

If the client receives an HTTP redirect request 506, the client sends the request over the network. The HTTP redirect request 506 is routed to the video optimizer 106. In one embodiment, the video detector 104 may monitor the traffic and/or requests from the client device as the HTTP redirect request 506 is routed the video optimizer 106. In such a configuration, the video optimizer 106 only sees requests for video files that need to be transcoded and are associated with a HTTP redirect request 506. As such, the video optimizer 106 is not burdened with all the requests generated by a client computing device 102.

The video optimizer 106 forwards the video HTTP get requests 508 to the origin server computing device 108 and receives a video file 510 from the origin server computing device 108. The video optimizer 106 transcodes the video file to a format usable by the client device and based on network conditions for sending the optimized video 512 to the client. In one embodiment, the video detector 104 intercepts the optimized video 512 and forwards 512 to the client. As such, the client receives the optimized video 512 for substantially real-time playback on an application executing on the client computing device 102.

In one embodiment, responsive to an HTTP get request 508 to an origin server computing device 108, the video optimizer receives a HTTP 404 error from the origin server computing device 108 as opposed to a video file. In such an instance, the video optimizer 106 appends a do not transcode flag to the HTTP redirect request received from the client computing device 102. The HTTP redirect request with the do not transcode flag is sent to the client computing device 102 wherein the client re-sends the request out over the network with the do not transcode flag. Because of the do not transcode flag, in such an instance, the video detector 104 and the video optimizer 106 do not intercept the request and it is propagated to the origin server computing device 108 wherein the origin server computing device 108 responds appropriately to the request. In another embodiment, video detector 104 detects the presence of the do not transcode flag from the HTTP response headers in the video optimizer's 106 response. It then stores that in a state cache that is used to remember that the video optimizer 106 could not optimize the video. When the client computing device 102 re-requests the original file, the video detector 104 inspects its state cache and detects the do not optimize state (based on URL). As such, the video detector 104 is prevented from sending the request back to the video optimizer 106. Entries in the state cache time out after the duration of the video, or the duration multiplied by a constant factor e.g. 2.0.

Figure 6:
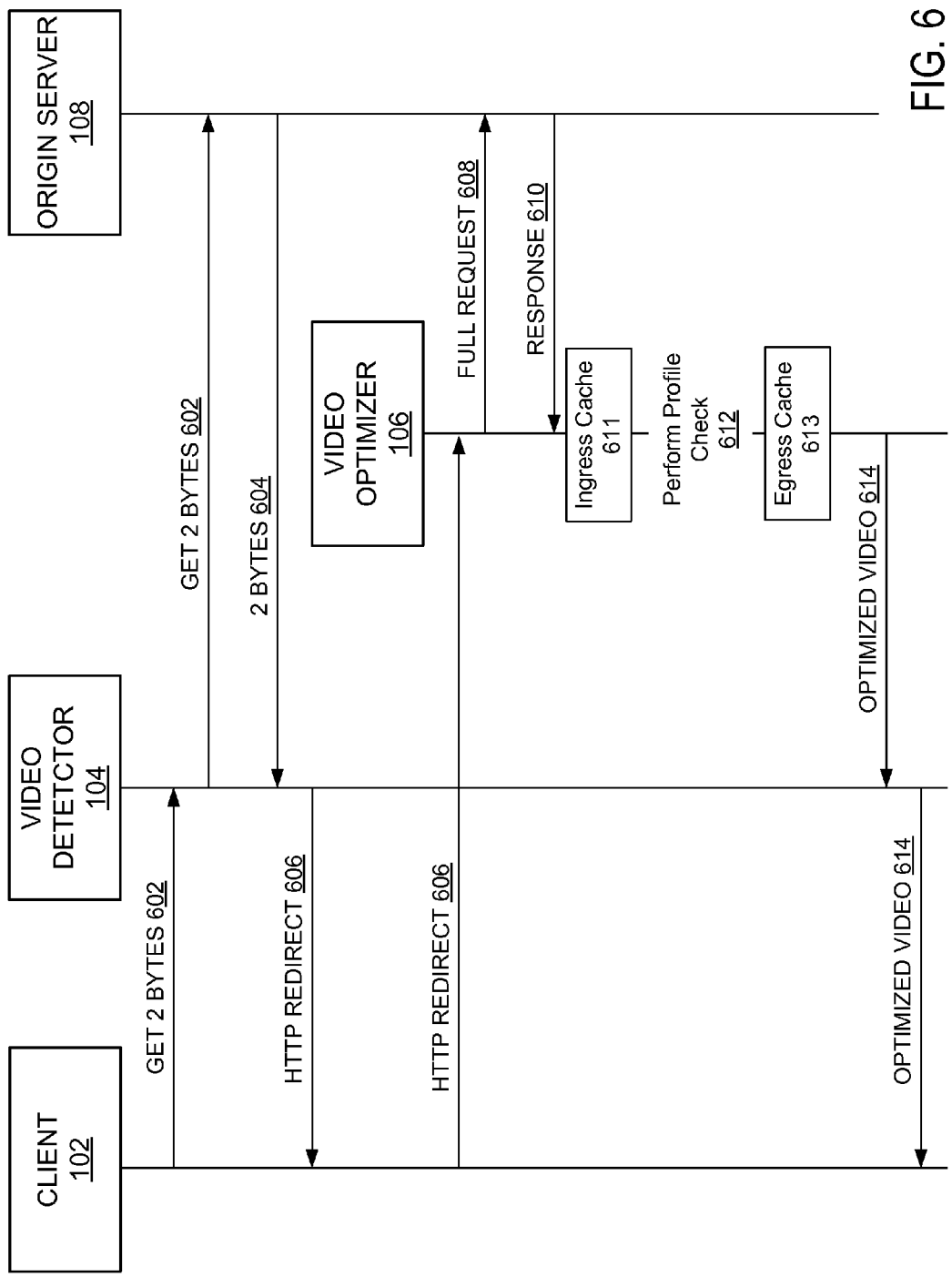
FIG. 6 is an interaction diagram illustrating a process flow for transcoding MP4 files in accordance with an embodiment.

FIG. 6 is an interaction diagram illustrating a process flow for transcoding MP4 files in accordance with an embodiment. In one embodiment, a client computing device 102 may only send a get 2 bytes 602 request to retrieve content from an origin server computing device 108. A video detector 104 intercepts all requests generated by the client and forwards the get 2 bytes request 602 to the origin server. In response, the video detector 104 receives 2 byes 604, re-writes it as a HTTP redirect request 606 and forwards it 606 to the client computing device 102.

The client device sends the received HTTP redirect request 606 with over a network wherein the HTTP redirect request 606 is routed to the video optimizer 106. In one embodiment, the video detector monitors network traffic coming from the client 102 including the HTTP redirect request 606. The video optimizer 106 generates a full request and forwards it 608 to the origin server computing device 108. Responsive to the full request, the video optimizer 106 receives a response 610 from the origin server computing device 108. The video optimizer 106 performs a profile check 612 on the received response 610 to determine if the response 610 is a video. If the response is not a video, the video optimizer 106 appends an origin server flag to the response 610 and forwards it to the client computing device 102.

In an embodiment wherein the profile check 612 determines that the response is a video, the video optimizer transcodes the video and sends the optimized video 614 to the client over a network. In one embodiment, the video optimizer 106 may comprise an egress cache 613 to store the transcoded file as the transcode process begins on the video optimizer 106. If a new request from client 102 comes in for a portion of the file that has already been transcoded, the request can be satisfied directly from the egress cache 613 without having to re-transcoded the video again. In an embodiment, wherein a seek request is provided by the client, the profile check 612 determines whether a byte range requested in the seek request exists in the egress cache 613. It the byte range does not exists in the egress cache 613, the video may be transcoded from before or at the seek point as described in the specification. In one embodiment, the video is transcoded from or before the seek point until it reaches a byte range provided in the egress cache 613 of another transcoding session. As such, the profile check 612 prevents two transcoding sessions from transcoding a same portion of the file. In one embodiment, the egress cache 613 is populated even if the client disconnects, enabling new request for the same file to be satisfied by the egress cache 613. For instance, if the transcoding is stopped at a byte range when a user disconnects, the transcoded file may not be useful to another user who may view the transcoded file to a later point. In one embodiment, an ingress cache 611 maintains files downloaded from the origin server computing device 108. Thus if another request for the same file is received from the client computing device, the file is retrieved from the ingress cache 611 as opposed to from the origin server computing device 108.

Figure 7:
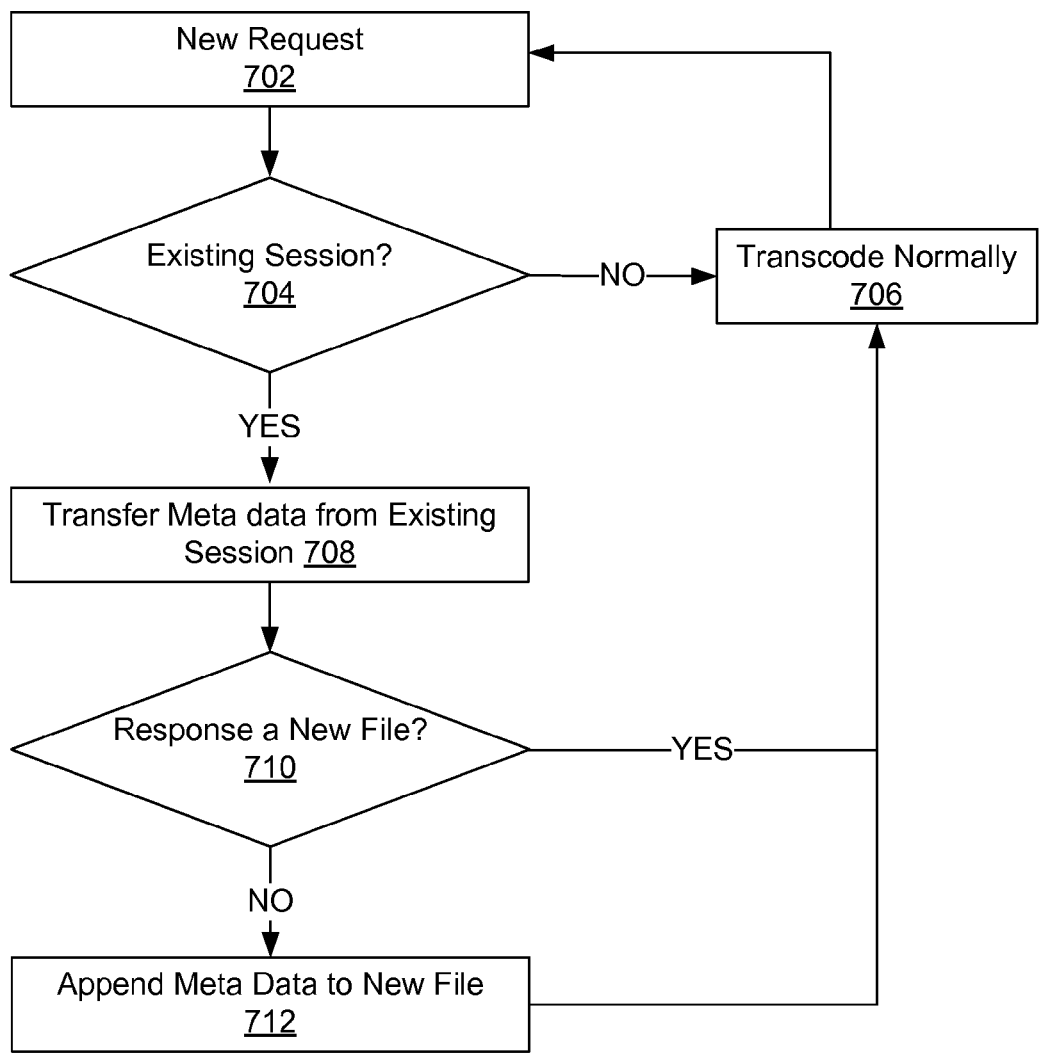
FIG. 7 is a diagram illustrating process steps for handling a seek operation, in accordance with an embodiment.

FIG. 7 is a diagram illustrating process steps for handling a seek operation. When a seek request is initiated on a client computing device 102, client sends the seek request with a time or a byte offset indicating a new position for video playback. The video detector forwards the seek request with the time or byte offset to the video optimizer 106, wherein the video optimizer 106 forwards it to the origin server computing device 108. Responsive to the request, the origin server 106 provides offset data to the video optimizer 106. The video optimizer receives the offset data and treats it as a new request 702 and begins to download a new file from the time or byte offset provided by the origin server computing device 108.

The process continues by determining whether the new request is associated with or is a seek function of an existing session 704. If the new request is not associated with an existing session 704, the video optimizer 106 transcodes 706 the new request as described in the specification, in reference to FIG. 4. If the new request is associated with an existing session 704, the process transfers 708 metadata information from the existing session. If the new request 702 is for an FLV file which includes header indicating the file is an FLV file, but does not contain any other metadata, the process appends metadata to the transcoded file associated with the seek operation.

Figure 8:
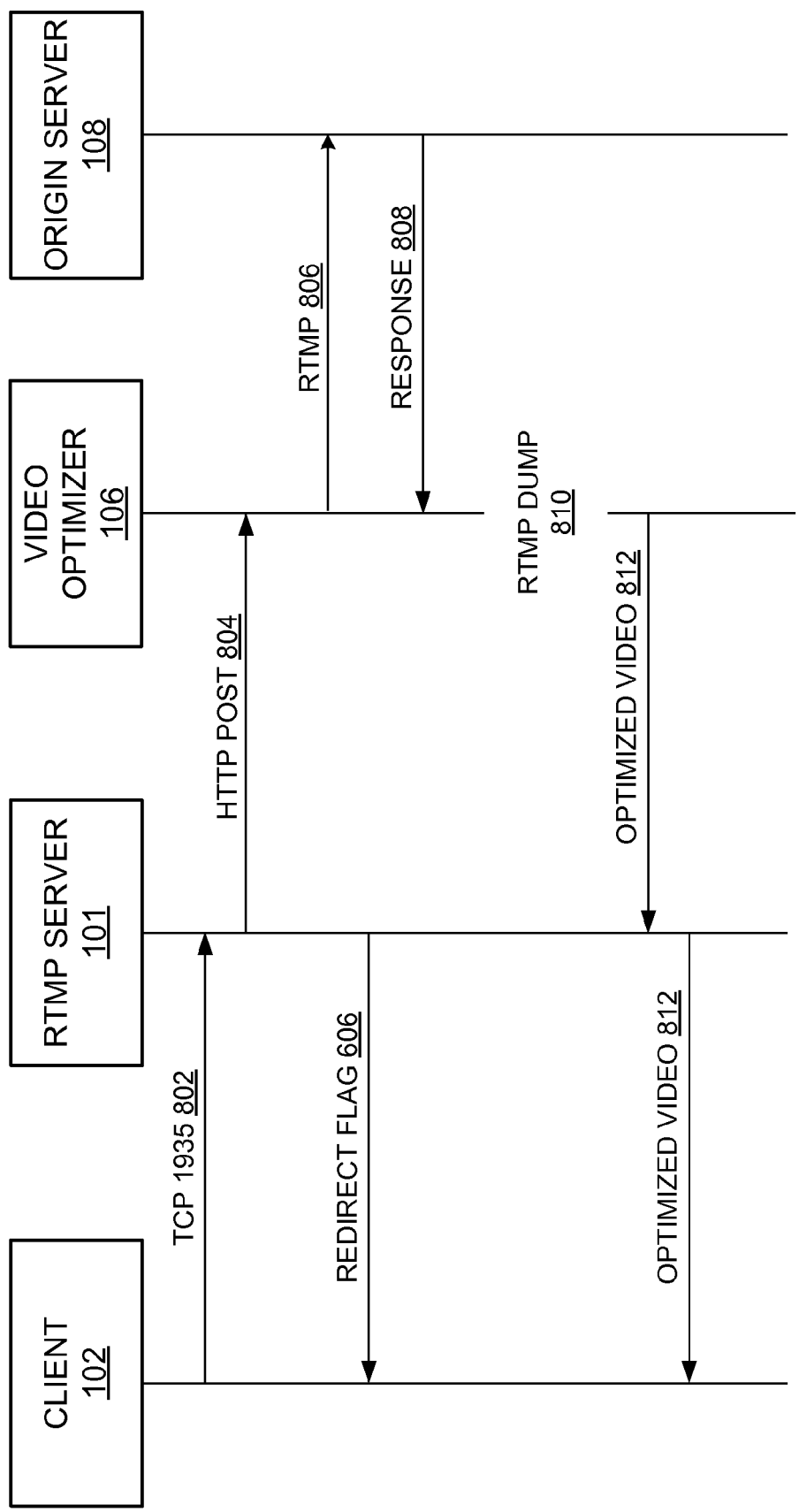
FIG. 8 is an interaction diagram illustrating a process flow for transcoding RTMP files in accordance with an embodiment.

FIG. 8 is an interaction diagram illustrating a process flow for transcoding RTMP files in accordance with an embodiment. Real Time Messaging Protocol (RTMP) does not permit HTTP style redirects. Accordingly, when the RTMP Server gets an RTMP connect request from the client, it does not proxy the request to the origin server like it would in the HTTP embodiment discussed in the specification. Instead, the RTMP server re-routes the request to the video optimizer 106. The request is a HTTP POST/PUT which contains the same data as the HTTP redirect request, as discussed in the specification, but also carries RTMP connect message payload in the POST data. Responsive to the HTTP POST, the video optimizer opens an RTMP session with the origin server via RTMP Dump and returns a transcoded video in the form of an FLV file. In one embodiment, the RTMP Server transforms this data into an RTMP stream and returns it to the client. If the RTMP Server decides not to transcode the request, it forwards the original RTMP data stream or rejects the original request from the client. RTMP Server forwards control messages to RTMP Dump in proxy fashion. These control messages include Pause, Seek, Stop, Resume, Play and any other control messages that affect the control of data emanating from the origin server.

As illustrated in FIG. 8, in one embodiment, the client computing device 102 sends a TCP 1935 request 802 to an RTMP server 101. The RTMP server converts the request to an HTTP POST/PUT request 804 and sends it the video optimizer 106. The video optimizer uses the HTTP POST/PUT request to generate an RTMP request on the origin server computing device 108. In such an instance, the video optimizer emulates a client computing device 102. Responsive to the RTMP request, the video optimizer 106 receives a response 808 from the origin server. Upon receiving the response, the video optimizer creates files based on the response and transcodes the response data 808. The optimized video is sent 812 to the RTMP server 101, wherein the RTMP server believes it is receiving the optimized data from a file based interface as opposed to stream based interface. The RTMP server 101 forwards the optimized video 812 to the client for streaming RTMP video on the client.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as described in FIGS. 3 and 6. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processor 202, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations, e.g., as described with FIGS. 4, 7 on data stored as bits or binary digital signals within a machine memory (e.g., a computer memory 204 or storage 216). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for providing streaming optimized video to a client computing device 102 and thereby providing an uninterrupted video playback session to a user through the disclosed principles herein. For example, the server encodes the text and image data such that the text data does not lose any resolution and can be rendered perfectly at any zoom level on the client device. Image data is considered less important to the browsing experience, however, as is delivered as a low resolution image data which may appear blocky and stretched out during an intermediate stage after the zoom in and before a hi-resolution image is retrieved and delivered to the client device. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for detecting a video seek request, the method comprising:
   receiving a hold-off status from an optimizer indicating that the optimizer is not receiving new transcoding sessions, the optimizer determining the hold-off status based on an estimate of a number of decode and encode macroblocks needed across existing transcoding sessions at the optimizer reaching a maximum capacity of macroblocks the optimizer can decode and encode per second, and wherein existing sessions at the optimizer are suspended for a period of time in response to a current video seek request prior to removal from a session table;
   monitoring communications on a network to detect a video seek request originating from a client device, the video seek request indicating a new position for video playback in a video;
   identifying whether the video seek request is associated with an existing session in the session table or constitutes a new session; and
   redirecting the video seek request originating from the client to the optimizer in hold-off status in response to identifying that the video seek request is associated with an existing session in the session table, the optimizer configured for, in response to receiving the redirected video seek request from the client device:
      establishing a first session with an origin server for retrieving video data from the origin server corresponding to the new position for video playback,
      transcoding the video data retrieved from the origin server over the first session corresponding to the new position for video playback, and
      establishing a second session with the client device for providing the transcoded video data corresponding to the new position for video playback to the client device.

2. The method of claim 1, wherein redirecting the video seek request originating from the client device comprises generating a uniform resource locator (URL) with a redirect request to the optimizer.

3. The method of claim 1, wherein redirecting the video seek request originating from the client device to the optimizer comprises:
   generating a URL with a redirect request, the redirect request directing the client device to the optimizer for establishing the second session; and
   transmitting the URL with the redirect request to the client device.

4. The method of claim 3, wherein the URL with the redirect request further comprises the video seek request indicating the new position for video playback.

5. The method of claim 1, wherein a unique identifier is assigned to each session directed to the optimizer and established with the client device.

6. The method of claim 5, wherein the unique identifier for the second session is based on one or more of a URL corresponding to the video, internet protocol address of the origin server where the video is stored, or internet protocol address of the client device.

7. The method of claim 1, further comprising replacing the existing session with the second session.

8. The method of claim 1, further comprising identifying metadata associated with the existing session and reusing the metadata for the second session, the metadata corresponding to parameters for transcoding the video data transmitted to the client device.

9. A non-transitory computer-readable storage medium storing executable computer program instructions for detecting a video seek request, the computer program instructions comprising instructions for:
   receiving a hold-off status from an optimizer indicating that the optimizer is not receiving new transcoding sessions, the optimizer determining the hold-off status based on an estimate of a number of decode and encode macroblocks needed across existing transcoding sessions at the optimizer reaching a maximum capacity of macroblocks the optimizer can decode and encode per second, and wherein existing sessions at the optimizer are suspended for a period of time in response to a current video seek request prior to removal from a session table;
   monitoring communications on a network to detect a video seek request originating from a client device, the video seek request indicating a new position for video playback in a video;
   identifying whether the video seek request is associated with an existing session in the session table or constitutes a new session; and
   redirecting the video seek request originating from the client to the optimizer in hold-off status in response to identifying that the video seek request is associated with an existing session in the session table, the optimizer configured for, in response to receiving the redirected video seek request from the client device:
      establishing a first session with an origin server for retrieving video data from the origin server corresponding to the new position for video playback,
      transcoding the video data retrieved from the origin server over the first session corresponding to the new position for video playback, and
      establishing a second session with the client device for providing the transcoded video data corresponding to the new position for video playback to the client device.

10. The storage medium of claim 9, wherein redirecting the video seek request originating from the client device to the optimizer comprises:

generating a URL with a redirect request, the redirect request directing the client device to the optimizer for establishing the second session; and transmitting the URL with the redirect request to the client device.

11. The storage medium of claim 10, wherein the URL with the redirect request further comprises the video seek request indicating the new position for video playback.

12. The storage medium of claim 9, wherein a unique identifier is assigned to each session directed to the optimizer and established with the client device.

13. The storage medium of claim 10, wherein the unique identifier for the second session is based on one or more of a URL corresponding to the video, internet protocol address of the origin server where the video is stored, or internet protocol address of the client device.

14. The storage medium of claim 9, further comprising instructions for identifying metadata associated with the existing session and reusing the metadata for the second session, the metadata corresponding to parameters for transcoding the video data transmitted to the client device.

15. A system comprising:
a video detector coupled to a network, the video detector configured to:
receive a hold-off status indicating that a video optimizer is not receiving new transcoding sessions,
monitor communications on a network to detect a video seek request originating from a client device coupled to the network, the video seek request indicating a new position for video playback in a video,
in response to detecting the video seek request, identify that the video seek request is associated with an existing session in a session table tracking existing sessions at a video optimizer in hold-off status or constitutes a new session, and
in response to identifying that the video seek request is associated with the existing session, transmit a redirect request to the client device from which the detected video seek request originated, the redirect request causing the client device to transmit a modified video seek request; and
a video optimizer coupled to the network, the video optimizer configured to:
determine a hold-off status based on an estimate of a number of decode and encode macroblocks needed across existing transcoding sessions at the video optimizer reaching a maximum capacity of macroblocks the video optimizer can decode and encode per second, and wherein existing sessions are suspended for a period of time in response to a current video seek request prior to removal from the session table,
receive the modified video seek request associated with the redirect request from the client device,
establish a first session with an origin server for retrieving video data from the origin server corresponding to the new position for video playback,
transcode the video data retrieved from the origin server over the first session corresponding to the new position for video playback, and
establish a second session with the client device for providing the transcoded video data corresponding to the new position for video playback to the client device.

16. The system of claim 15, wherein redirecting the video seek request originating from the client device to the video optimizer comprises:
generating a URL with a redirect request, the redirect request directing the client device to the video optimizer for establishing the second session; and
transmitting the URL with the redirect request to the client device.

17. The system of claim 16, wherein the URL with the redirect request further comprises the video seek request indicating the new position for video playback.

18. The system of claim 15, wherein a unique identifier is assigned to each session directed to the video optimizer and established with the client device.

19. The system of claim 18, wherein the unique identifier for the second session is based on one or more of a URL corresponding to the video, internet protocol address of the origin server where the video is stored, or internet protocol address of the client device.

20. The system of claim 15, wherein the video optimizer identifies metadata associated with the existing session and reuses the metadata for the second session, the metadata corresponding to parameters for transcoding the video data transmitted to the client device.

* * * * *